United States Patent
Kobashigawa et al.

(10) Patent No.: US 11,958,242 B2
(45) Date of Patent: Apr. 16, 2024

(54) THREE-DIMENSIONAL MODELING APPARATUS AND THREE-DIMENSIONAL MODELING METHOD

(71) Applicants: Shohta Kobashigawa, Tokyo (JP); Takashi Fujita, Kanagawa (JP)

(72) Inventors: Shohta Kobashigawa, Tokyo (JP); Takashi Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 121 days.

(21) Appl. No.: 17/160,549

(22) Filed: Jan. 28, 2021

(65) Prior Publication Data

US 2021/0252782 A1 Aug. 19, 2021

(30) Foreign Application Priority Data

Feb. 19, 2020 (JP) .................................. 2020-026565
Oct. 30, 2020 (JP) .................................. 2020-182382

(51) Int. Cl.
*B29C 64/205* (2017.01)
*B33Y 10/00* (2015.01)
*B33Y 30/00* (2015.01)
*B29C 64/141* (2017.01)

(52) U.S. Cl.
CPC .......... *B29C 64/205* (2017.08); *B29C 64/141* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| 5,935,462 | A | 8/1999 | Tatah |
| 6,025,110 | A | 2/2000 | Nowak |
| 10,427,322 | B2 | 10/2019 | Suzuki et al. |
| 10,682,808 | B2 | 6/2020 | Fujita et al. |
| 2004/0182510 | A1* | 9/2004 | Pfeifer ............... B22F 3/004 156/272.8 |
| 2017/0216918 | A1 | 8/2017 | Orme-Marmarelis |
| 2017/0232673 | A1* | 8/2017 | Usami ............... B29C 64/393 156/64 |

(Continued)

FOREIGN PATENT DOCUMENTS

| CN | 107962770 | 4/2018 |
| JP | 2016-117273 | 6/2016 |

(Continued)

OTHER PUBLICATIONS

Britannica, The Editors of Encyclopaedia. "Lorentz force". Encyclopedia Britannica, May 27, 2020, https://www.britannica.com/science/Lorentz-force. Accessed Jul. 21, 2022. (Year: 2020).*

(Continued)

*Primary Examiner* — Farah Taufiq
(74) *Attorney, Agent, or Firm* — IPUSA, PLLC

(57) ABSTRACT

A three-dimensional modeling apparatus includes a carrier configured to carry a modeling material, a device configured to cause the modeling material carried by the carrier to fly to the surface of an object, and an external force applying member configured to apply a predetermined external force to the modeling material when the modeling material is flying.

11 Claims, 6 Drawing Sheets

(56) References Cited

U.S. PATENT DOCUMENTS

| | | | |
|---|---|---|---|
| 2017/0348872 A1* | 12/2017 | Suzuki | B41J 2/14104 |
| 2018/0015502 A1 | 1/2018 | Zenou | |
| 2018/0024462 A1* | 1/2018 | Shimada | G03G 15/051 |
| | | | 399/92 |
| 2020/0230887 A1 | 7/2020 | Arao et al. | |
| 2020/0379251 A1 | 12/2020 | Suhara et al. | |
| 2022/0401993 A1* | 12/2022 | Zenou | B29C 64/141 |

FOREIGN PATENT DOCUMENTS

| | | |
|---|---|---|
| JP | 2019-077935 | 5/2019 |
| JP | 2020-196196 | 12/2020 |
| WO | 2016/136722 | 9/2016 |

OTHER PUBLICATIONS

Extended European Search Report for 21154947.2 dated Jul. 1, 2021.

* cited by examiner

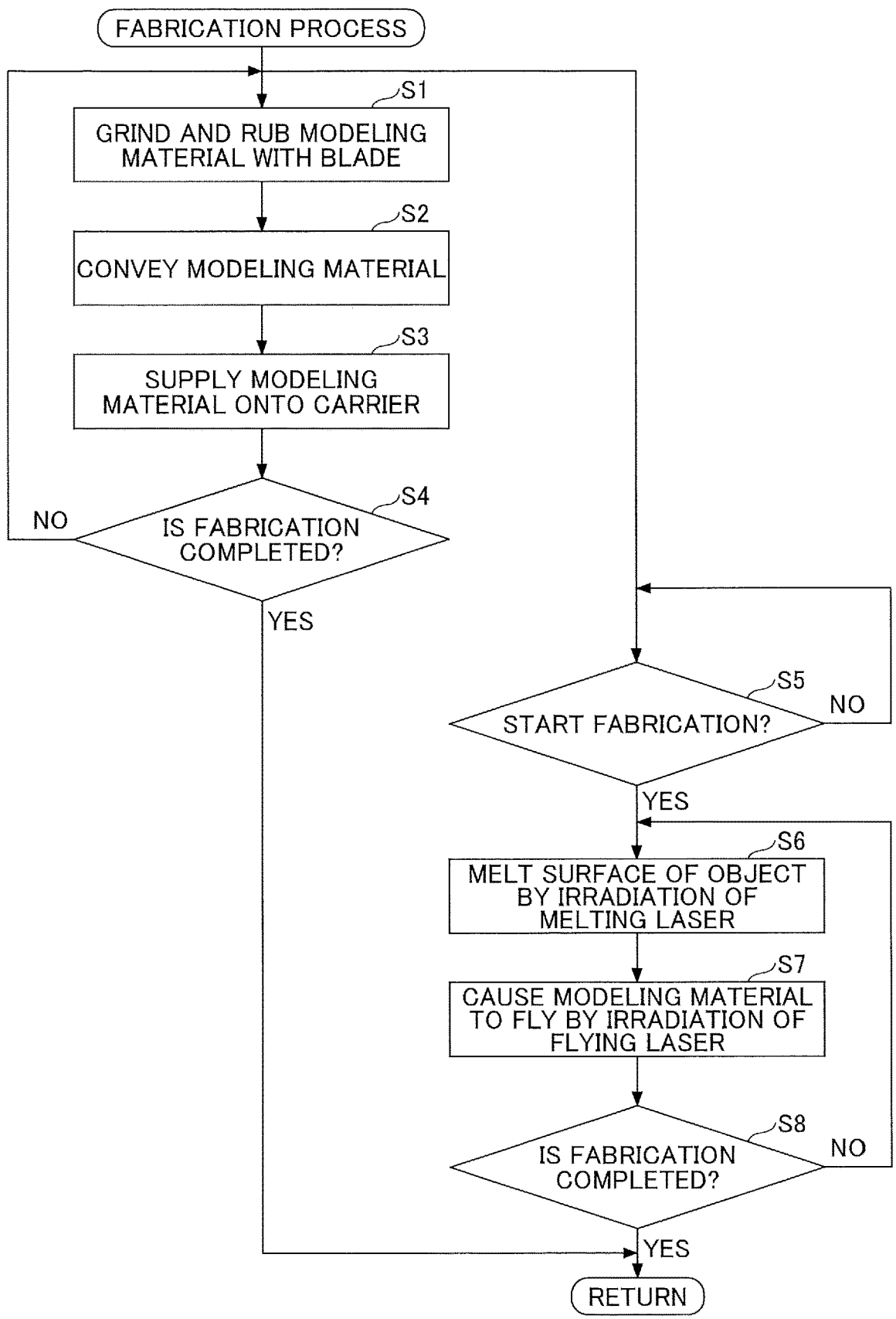

FIG.4
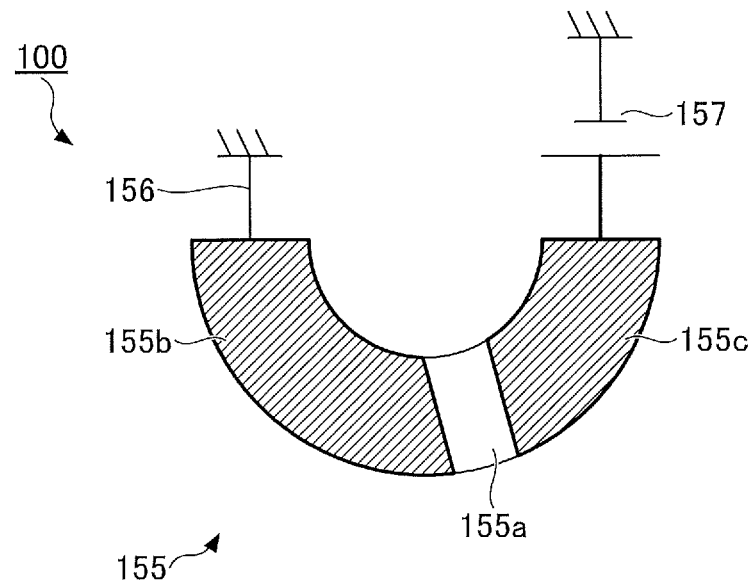
FIG.5
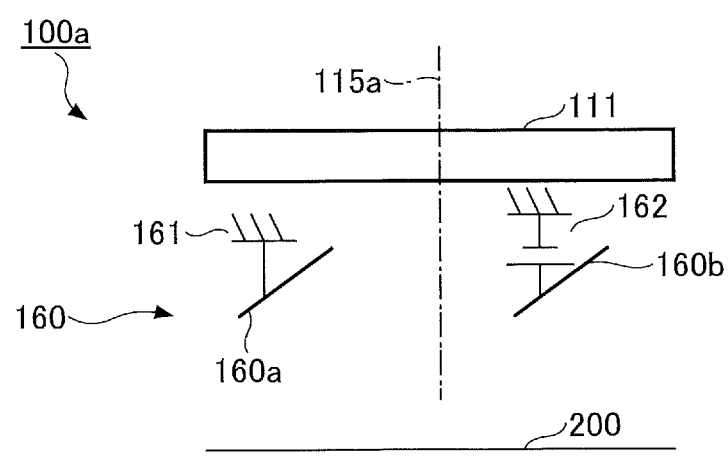
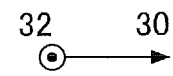

THREE-DIMENSIONAL MODELING APPARATUS AND THREE-DIMENSIONAL MODELING METHOD

CROSS-REFERENCE TO RELATED APPLICATIONS

The present application claims priority under 35 U.S.C. § 119 to Japanese Patent Application No. 2020-026565, filed on Feb. 19, 2020, and Japanese Patent Application No. 2020-182382, filed on Oct. 30, 2020, the entire contents of which are incorporated herein by reference.

BACKGROUND OF THE INVENTION

1. Field of the Invention

The disclosures herein relate to a three-dimensional modeling apparatus and a three-dimensional modeling method.

2. Description of the Related Art

As apparatuses for fabricating three-dimensional objects, additive manufacturing apparatuses utilizing techniques such as material extrusion (MEX), vat photopolymerization (VPP), powder bed fusion (PBF), material jetting (MJT), binder jetting (BJT), sheet lamination (SHL), and directed energy deposition (DED) are known.

Further, there is known an apparatus configured to cause a three-dimensional modeling material that absorbs light to fly to an object by emitting an optical vortex laser beam to the modeling material, thereby causing the modeling material to adhere to the object (see Patent Document 1, for example).

However, in the apparatus described in Patent Document 1, the flown modeling material is cured by ultraviolet irradiation after adhering to the object. Therefore, the modeling material may be dispersed when colliding with the object, and as a result, fabrication quality may be degraded.

RELATED-ART DOCUMENTS

Patent Documents

Patent Document 1: Re-publication of PCT International Publication No. 2016-136722

SUMMARY OF THE INVENTION

According to at least one embodiment, a three-dimensional modeling apparatus includes a carrier configured to carry a modeling material, a device configured to cause the modeling material carried by the carrier to fly to the surface of an object, and an external force applying member configured to apply a predetermined external force to the modeling material when the modeling material is flying.

BRIEF DESCRIPTION OF THE DRAWINGS

Other objects and further features of the present invention will be apparent from the following detailed description when read in conjunction with the accompanying drawings, in which:

FIG. 2 is a flowchart illustrating effects of the three-dimensional modeling apparatus according to the first embodiment;

FIG. 4 is a diagram illustrating an example configuration of a fixing member;

FIG. 5 is a diagram illustrating an example configuration of an electrically conductive member of a three-dimensional modeling apparatus according to a second embodiment;

DESCRIPTION OF THE EMBODIMENTS

Figure 1:
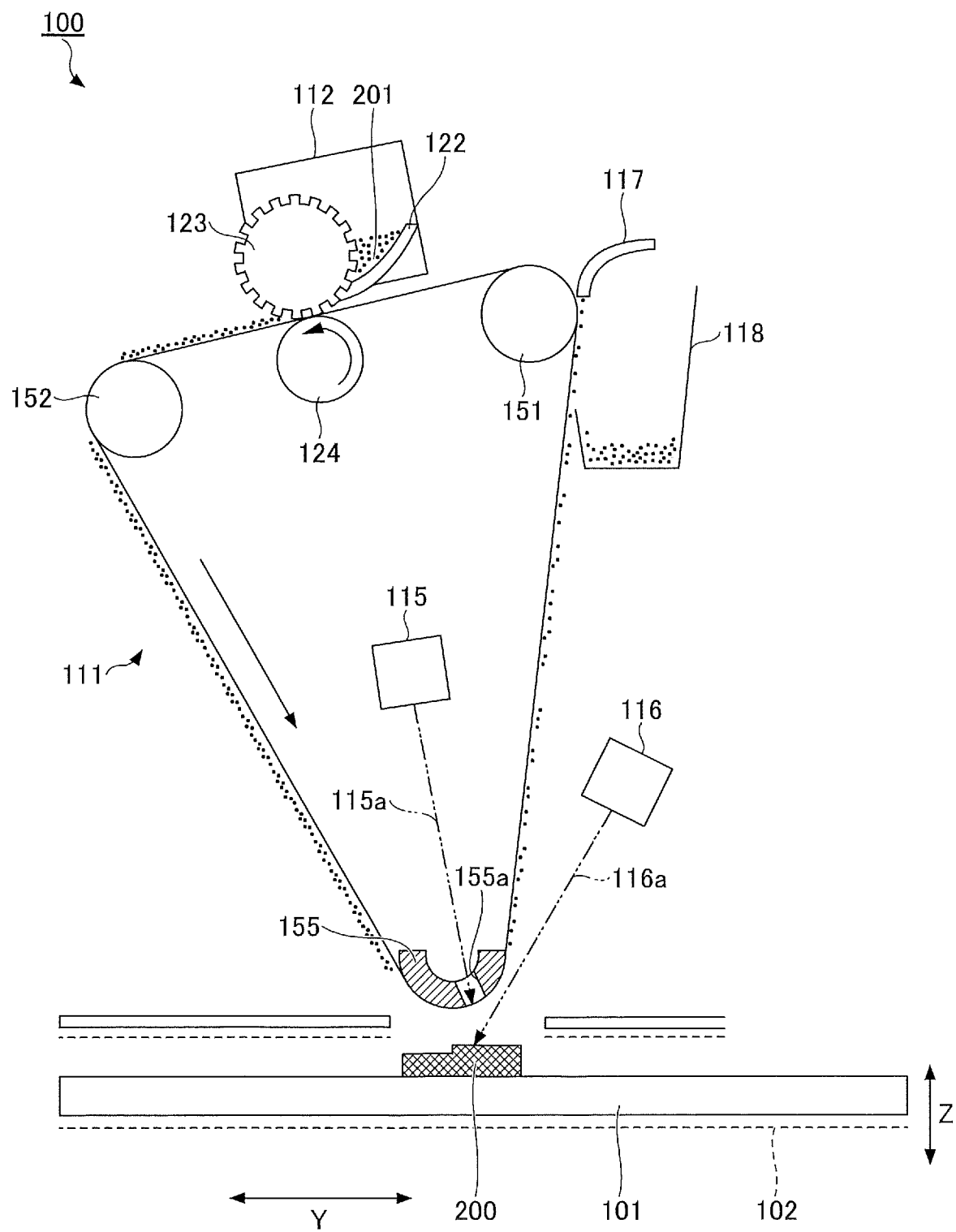
FIG. 1 is a diagram illustrating an example configuration of a three-dimensional modeling apparatus according to a first embodiment.

It is a general object of the present invention to improve fabrication quality.

In the following, embodiments of the present invention will be described with reference to the accompanying drawings. In the drawings, the same elements are denoted by the same reference numerals, and a duplicate description thereof may be omitted.

In the following embodiments, when a modeling material carried by a carrier is caused to fly to the surface of an object, a predetermined external force caused by an electric field, airflow, or gravity is applied to the flown modeling material. In this manner, variations in the landing position of the modeling material on the surface of the object due to inertia and variations in flying time can be reduced, thus improving fabrication quality.

First Embodiment

<Example Configuration of Three-Dimensional Modeling Apparatus 100>

First, an apparatus for fabricating a three-dimensional object (hereinafter referred to as a "three-dimensional modeling apparatus 100") according to a first embodiment will be described with reference to FIG. 1. FIG. 1 is a diagram illustrating an example configuration of the three-dimensional modeling apparatus 100.

As illustrated in FIG. 1, the three-dimensional modeling apparatus 100 includes a stage 101, a stage heater 102, a carrier 111, a fixing member 155, a supply device 112, a flying laser 115, a melting laser 116 functioning to apply energy, a cleaning blade 117, and a collecting case 118.

The stage 101 is a support member that supports an object 200 to be fabricated (an object in a fabrication process). The stage 101 can move back and forth in directions indicated by an arrow Y, and can also move up and down in directions indicated by an arrow Z at a pitch of 0.05 mm (modeling thickness), for example.

The stage heater 102 is disposed below the stage 101, and the temperature of the stage 101 is controlled to match the temperature of a modeling material 201.

The carrier 111 is an endless belt that circularly moves. Specifically, the carrier 111 is composed of a polyethylene terephthalate (PET) film (Lumirror, manufactured by Toray Industries, Inc.). Alternatively, the carrier 111 may be composed of a polyimide film (Kapton H, manufactured by Toray Industries, Inc.).

The carrier 111 is disposed above (on the upper side in the Z direction of) the stage 101, and is stretched over rollers 151 and 152 and the fixing member 155. The carrier 111 carries the particulate modeling material 201, and conveys the modeling material 201 to a position above the object 200 on the stage 101. However, the carrier 111 is not limited to the endless belt, and the carrier 111 may be a rotary drum that is composed of a cylindrical glass member and rotates in a direction (conveying direction) indicated by an arrow while carrying the modeling material 201.

The fixing member 155 is a support member that supports the carrier 111, and is disposed above the stage 101 at a position (fabrication position) where the object 200 is fabricated. A configuration and functions of the fixing member 155 will be described later in detail with reference to FIG. 4.

The modeling material 201 can be appropriately selected depending on the object 200. For example, the modeling material 201 may be a resin, such as polyamide 12 (PA 12), polybutylene terephthalate (PBT), polysulfone (PSU), polyamide 66 (PA 66), polyethylene terephthalate (PET), liquid crystal polymer (LCP), polyether ether ketone (PEEK), polyacetal (PON), polysulfone (PSF), polyamide 6 (PA 6), or polyphenylene sulfide (PPS). Further, the modeling material 201 is not limited to a crystalline resin, and may be an amorphous resin such as polycarbonate (PC), acrylonitrile butadiene styrene (ABS), or polyetherimide (PEI). Alternatively, the modeling material 201 may be a mixture of a crystalline resin and an amorphous resin.

Alternatively, the modeling material 201 may be any material other than a resin, such as metal, ceramic, or liquid. Further, the modeling material 201 may be a material having a viscosity greater than or equal to 1 Pascal-second (Pas).

In the present embodiment, the modeling material 201 is carried on the peripheral surface of the carrier 111 by the van der Waals force. If the resistance value of the modeling material 201 is high, the modeling material 201 can be carried only by electrostatic adhesion.

The supply device 112 is disposed on the carrier 111, and is configured to supply the modeling material 201 to the peripheral surface (front surface) of the carrier 111.

The supply device 112 includes a knurling roller 123 and a blade 122. In addition, a contact roller 124 having a rubber layer on the surface thereof is disposed facing the knurling roller 123.

The supply device 112 grinds and rubs the modeling material 201 with the blade 122 to loosen the aggregation of the modeling material 201, and causes the modeling material 201 to pass through the knurling roller 123, such that a thin layer of the modeling material 201 is formed on the peripheral surface of the carrier 111.

However, the configuration of the supply device 112 is not limited to the above-described configuration using the knurling roller 123, and a configuration using a mesh roller may be used. Alternatively, a contact supply method or a non-contact supply method using a rotating body, a mesh-based non-contact spray method, or a fluidized bed coating method in which powder particles are dispersed by air may be used.

The flying laser 115 functioning to cause the modeling material 201 to fly from the peripheral surface of the carrier 111 is disposed inside the carrier 111.

The flying laser 115 is a pulsed laser, and irradiates the modeling material 201 with pulsed laser light 115a from the inside of the carrier 111 (the irradiation position corresponds to a "fabrication position"). The flying laser 115 is an example of a device configured to cause the modeling material 201 to fly.

By irradiating the modeling material 201 with the pulsed laser light 115a, a force called radiation pressure is exerted on the modeling material 201, thereby causing the adhesion force of the particulate modeling material 201 to be released. As a result, the modeling material 201 falls down by gravity. As is known, laser induced forward transfer (LIFT) as described in US006025110A is a non-contact technique that transfers a film material or a liquid material from a carrier to a receiver surface by laser irradiation. The material is locally heated and vaporized, and as a result, the material flies from the peripheral surface of the carrier in the direction of laser irradiation.

As used herein, the term "fly" means that the modeling material 201 is moved from the carrier 111 to the stage 101 side in a non-contact manner. Because the modeling material 201 can be moved in a non-contact manner instead of being transferred, the loss of the modeling material 201 can be reduced and the fabrication accuracy can be improved.

In the example of FIG. 1, the modeling material 201 is caused to fly in the direction of gravity toward the stage 101. However, the modeling material 201 is not necessarily maintained at an angle of 90° with respect to the stage 10 when flying, and the modeling material 201 may be tilted at a desired angle with respect to the stage 10 when flying, as necessary.

In the present embodiment, it is not necessarily said that there is no contribution of the laser induced forward transfer technique. However, for the following reasons, the radiation pressure technique is mainly adopted.

1. The energy required to cause black powder, having a high absorption rate of laser light, to fly is equivalent to the energy required to cause transparent powder to fly.

2. The transparent powder flies even when the carrier is formed of a transparent resin film.

3. The transparent resin film forming the carrier is not degraded by being irradiated with pulsed laser light a plurality of times, up to 1000 times.

The distance between the carrier 111 and the object 200 is preferably approximately 3 times to 4 times greater than the average particle diameter of the modeling material 201. In this manner, the contact between an upper-side particle and a lower-side particle before and after being flown can be avoided. Thus, the dispersion of the modeling material 201 due to flying can be avoided.

Further, the melting laser 116 functioning to heat the surface of the object 200 is disposed outside of the carrier 111. As the melting laser 116, a pulsed laser is not required to be actively used, and a continuous-wave laser is suitable.

The melting laser 116 heats and melts the surface of the object 200 to be fabricated on the stage 101, such that the surface of the object 200 is in a melted state.

As described, the melting laser 116 heats and melts the surface of the object 200, such that the surface of the object 200 is in a melted state. However, as long as the surface of the object 200 is melted by the energy of one or more energy sources, convection, a lamp, inductive heating, dielectric heating, and the like may be applied instead of laser heating. Further, the "surface" may include one layer that is formed at once, or may include a plurality of layers such as two or three layers. Alternatively, the "surface" may include a part of or the entirety of each layer. That is, it is important for the "surface" to include a part of the outermost layer.

In FIG. 1, laser light 116a, emitted from the melting laser 116, is directed at the irradiation position of the pulsed laser light 115a (the landing position of the modeling material 201). The irradiation positions of the laser light 116a and the pulsed laser light 115a can be adjusted, and may be changed in accordance with the type of the material and the fabrication speed.

Accordingly, the modeling material 201, caused to fly by the irradiation of the laser light 116a, lands on the surface of the object 200 melted by the laser light 116a emitted from the melting laser 116. As a result, the modeling material 201 adheres to the object 200.

The relationship between the timing at which the modeling material 201 flies and the timing at which the object 200 starts to be melted is not particularly limited. That is, the surface of the object 200 may be melted before the modeling material 201 flies. Alternatively, the surface of the object 200 may be melted after the modeling material 201 flies. Further, after the modeling material 201 flies, the surface of the object 200 may be melted, and the modeling material 201 may land on the melted surface of the object 200.

Variations in landing positions and inappropriate landing positions can be adjusted for each layer. The shape of an object is not determined by the flying laser 115 and is determined by the melting laser 116.

Further, the carrier 111 includes the cleaning blade 117 that removes the modeling material 201 remaining on the carrier 111. The cleaning blade 117 is disposed on the downstream side in the rotational direction of the carrier 111. The modeling material 201 removed by the cleaning blade 117 is collected in the collecting case 118.

<Effects of Three-Dimensional Modeling Apparatus 100>

Next, effects of the three-dimensional modeling apparatus 100 will be described with reference to a flowchart of FIG. 2.

When the three-dimensional modeling apparatus 100 starts a fabrication process, the supply device 112 grinds and rubs a modeling material 201 stored in the supply device 112 with the blade 122 (step S1, hereinafter simply referred to as "S1"). The modeling material 201 is conveyed by the knurling roller 123 (S2), and the modeling material 201 is supplied onto the peripheral surface of the carrier 111 such that portions of the modeling material 201 do not overlap (S3). The supply device 112 continues to supply the modeling material 201 onto the carrier 111 until the fabrication is completed.

In this manner, the supply device 112 supplies the modeling material 201 onto the peripheral surface of the carrier 111. The modeling material 201 is carried on the surface of the carrier 111 disposed above the stage 101 that supports an object 200.

The modeling material 201 is conveyed to a position above the stage 101 by the rotation of the carrier 111, and a ceiling of the modeling material 201 is formed above the stage 101.

In the meantime, at a timing at which the fabrication is started (S5), the melting laser 116 emits the laser light 116a to heat and melt a part of the surface of the object 200 to which the modeling material 201 adheres (S6). Note that a first layer forming the object 200 is fused because of the temperature of the stage heater 102.

The flying laser 115 irradiates the modeling material 201 with the pulsed laser light 115a based on fabrication data, thereby causing the modeling material 201 carried by the carrier 111 to fly from the carrier 111 to the melted part of the object 200 (S7).

The modeling material 201 flown from the carrier 111 lands on the melted part of the surface of the object 200, and is integrated with the object 200. That is, the object 200 is grown by an amount corresponding to the integrated modeling material.

Accordingly, while sequentially conveying the modeling material 201 by the continuous rotation of the carrier 111 to a position above the stage 101, the three-dimensional modeling apparatus 100 repeats the fabrication process for causing the melting laser 116 to melt the surface of the object 200, and causing the flying laser 115 to irradiate the modeling material 201 such that the modeling material 201 flies and lands on the object 200, until the fabrication is completed (S8).

In this manner, a three-dimensional object can be fabricated by growing the object 200 to a desired shape.

The modeling material 201, flown from the carrier 111, lands on and adheres to the melted surface of the object 200. Therefore, the modeling material 201 is not dispersed due to collision with the object 200. Accordingly, even edges of the object 200 can be highly accurately formed, thus improving fabrication quality.

Further, the modeling material 201 is not limited to a crystalline resin, and a mixture of a crystalline resin and an amorphous resin can be used as the modeling material 201. Therefore, a variety of materials can be utilized. Further, the fabrication speed can be increased by continuous fabrication, and waste materials can be reduced.

<Flying Direction of Modeling Material 201>

Next, the flying direction of the modeling material 201 will be described with reference to FIGS. 3A through 3C. FIG. 3A is a diagram illustrating a deviation of the flying direction of a modeling material 201a due to inertia, FIG. 3B is a diagram illustrating a variation in the flying directions of modeling materials 201b and 201c, and FIG. 3C is a diagram illustrating an effect of reducing a variation in the flying directions of modeling materials 201d and 201e according to the first embodiment.

Figure 3C:
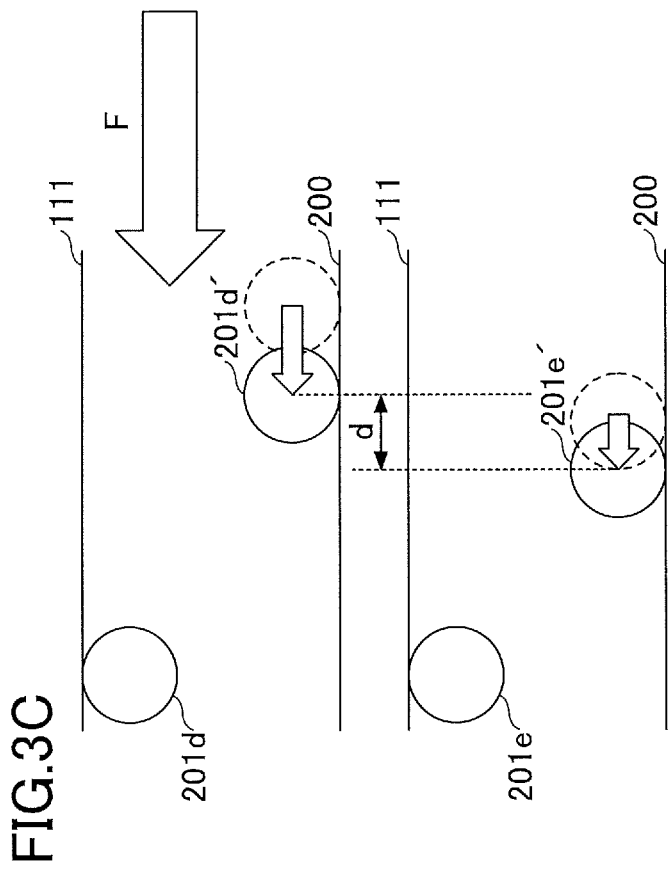
FIG. 3C is a diagram illustrating an effect of reducing a variation in the flying directions of modeling materials.
Figure 3A:
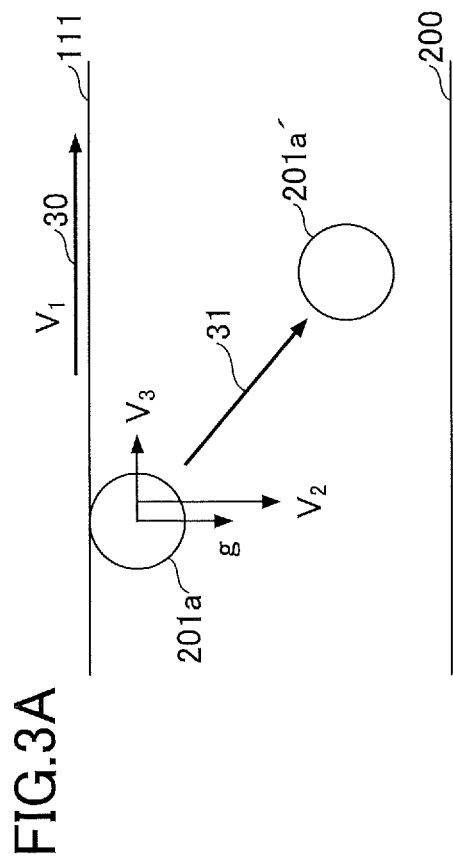
FIG. 3A is a diagram illustrating a deviation of the flying direction of a modeling material.
Figure 3B:
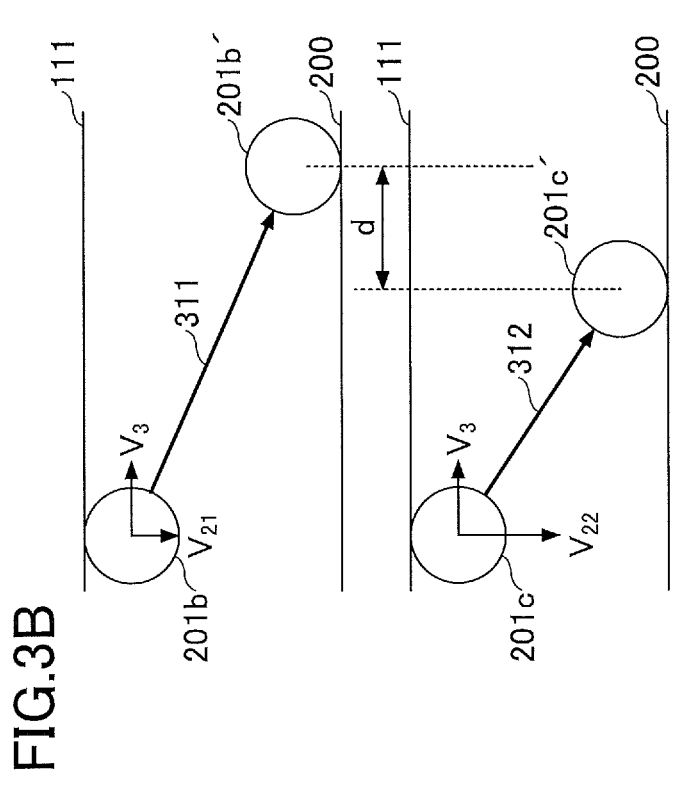
FIG. 3B is a diagram illustrating a variation in the flying directions of modeling materials.

In each of the examples illustrated in FIGS. 3A through 3C, while the carrier 111 is circularly moving at a moving velocity $V_1$, a modeling material carried by the carrier 111 is irradiated with the pulsed laser light 115a, and the modeling material flies toward the surface of the object 200. The direction indicated by an arrow 30 is the moving direction of the carrier 111 and is an example of a "predetermined direction".

In FIG. 3A, the modeling material 201a flies towards the surface of the object 200 at an initial velocity $V_2$ in the direction of gravity g. At this time, the force of inertia of the moving carrier 111 acts on the modeling material 201a. Thus, the modeling material 201a flies at an initial velocity $V_3$ also in the moving direction indicated by the arrow 30.

As a result of summing the initial velocities $V_2$ and $V_3$, the modeling material 201a flies in a direction indicated by an arrow 31 deviated from the direction of gravity g, which is a target direction of the modeling material 201a. Note that a modeling material 201a' represents a modeling material that has flown in the direction indicated by the arrow 31 in FIG. 3A.

For example, when it is assumed that the moving velocity $V_1$ of the modeling material 201a is 100 (mm/s) and the flying time of the modeling material 201 is 0.02 (s), the modeling material 201a lands on the surface of the object 200 at a position deviated by "100·0.02=2 (mm)" in the moving direction with respect to the direction of gravity g.

Further, the flying time of the modeling material 201 may vary. Example factors of variations in flying time include variations in the initial velocity of modeling materials at the time of laser irradiation, variations in air resistance due to the difference in particle sizes of modeling materials, an effect caused by the collision of modeling materials, and an effect caused by the rotation of a modeling material.

In the upper part of FIG. 3B, an initial velocity $V_{21}$ indicates an initial velocity component of the modeling material 201b in the direction of gravity g. As a result of summing the initial velocity $V_{21}$ in the direction of gravity g and the initial velocity $V_3$ in the moving direction, the modeling material 201b flies in a direction indicated by an arrow 311. In the lower part of FIG. 3B, an initial velocity $V_{22}$ indicates an initial velocity component of the modeling material 201c in the direction of gravity g, and the initial velocity $V_{22}$ is greater than the above-described initial velocity $V_{21}$. As a result of summing the initial velocity $V_{22}$ in the direction of gravity g and the initial velocity $V_3$ in the moving direction, the modeling material 201c flies in a direction indicated by an arrow 312. The direction indicated by the arrow 312 is close to the direction of gravity g as compared to the direction indicated by the arrow 311.

As a result of the above-described variation in the flying directions of the modeling materials 201b and 201c, the landing position of the modeling materials 201b and 201c on the surface of the object 200 would vary by a distance d. Such a variation would degrade the fabrication quality of the three-dimensional modeling apparatus 100.

Conversely, in the present embodiment, as illustrated in FIG. 3C, an external force F in a direction opposite to the moving direction of the carrier 111 is applied to flown modeling materials 201d and 201e. The external force F is caused by an electrostatic force generated by an electric field that is created by applying a voltage. The external force F is an example of a "predetermined external force". However, the external force F is not necessarily caused by the electrostatic force, as long as the force can be applied uniformly to the flown modeling materials 201d and 201e. The external force F may be caused by the power of the airflow, magnetic force, gravity, or the like.

The external force F causes the flown modeling materials 201d and 201e to be moved in the direction opposite to the moving direction of the carrier 111, thereby reducing a variation in the landing positions of the modeling materials 201d and 201e on the surface of the object 200. In addition, the longer the flying time of a modeling material is, the greater the amount of movement of the modeling material by the external force F becomes. Further, the shorter the flying time of a modeling material is, the smaller the amount of movement of the modeling material by the external force F becomes. As a result, a variation in the landing positions of the modeling materials 201d and 201e on the surface of the object 200 can be reduced.

<Configuration of Fixing Member 155>

Next, a configuration of the fixing member 155 will be described with reference to FIG. 4. FIG. 4 is a diagram illustrating an example configuration of the fixing member 155.

As illustrated in FIG. 4, the fixing member 155 is a member having a half-ring shape, and a slit portion 155a is formed in a part of the fixing member 155. In the three-dimensional modeling apparatus 100, the fixing member 155 is disposed facing the object 200 with the carrier 111 being interposed between the fixing member 155 and the object 200. The pulsed laser light 115a of the flying laser 11 passes through the slit portion 155a and is emitted to the carrier 111.

The fixing member 155 is composed of a conductor such as stainless steel (SUS) metal, and is electrically conductive while ensuring wear resistance against contact with the carrier 111 that is stretched over the periphery of the fixing member 155.

The slit portion 155a of the fixing member 155 is composed of an insulator, such as glass, that is transparent to the pulsed laser light 115a. The fixing member 155 is separated into one end portion 155b and the other end portion 155c by the slit portion 155a composed of the insulator. Therefore, the one end portion 155b is insulated from the other end portion 155c with the slit portion 155a being interposed therebetween.

Further, because the slit portion 155a is transparent to the pulsed laser light 115a, the pulsed laser light 115a can pass through the slit portion 155a and can be emitted to the modeling material 201 carried by the carrier 111. The fixing member 155 is an example of an "external force applying member" configured to apply the external force F, and is also configured to support the carrier 111.

Note that the slit portion 155a is not necessarily composed of the insulator, and may be an opening. With this configuration, the pulsed laser light 115a can pass through the slit portion 155a, and the one end portion 155b can be insulated from the other end portion 155c.

The one end portion 155b is connected to a grounded portion 156, and the other end portion 155c of the fixing member 155 is electrically connected to a power supply 157. When the flying laser 115 emits the pulsed laser light 115a, the power supply 157 applies a voltage, thereby creating an electric field in the slit portion 155a.

Typically, the modeling material 201 carries minute electric charges during the conveyance of the modeling material 201. By utilizing the electric charges, an electrostatic force in the direction opposite to the moving direction of the carrier 111 can be applied to the modeling material 201. This electrostatic force causes the flown modeling material 201 to be moved in the direction opposite to the moving direction of the carrier 111, thereby reducing the variation in the landing position of the modeling material 201.

Further, in the present embodiment, PA 12 is used as the modeling material 201, and the modeling material 201 is positively charged. Accordingly, an electric field in the downstream direction is created on the surface of the carrier 111 by arranging the grounded portion 156 on the upstream side in the moving direction of the carrier 111 and the power supply 157 for applying a voltage on the downstream side. Therefore, the electrostatic force in the direction opposite to the moving direction of the carrier 111 can be applied to the modeling material 201.

The modeling material 201 may be negatively charged depending on the type of the modeling material 201. In such a case, the grounded portion 156 and the power supply 157 illustrated in FIG. 4 may be arranged reversely. Further, a switch or any other device may be utilized to switch the arrangement of the power supply 157 and the grounded portion 156 depending on the type of the modeling material 201. In this manner, the external force F caused by the electrostatic force can be appropriately applied in accordance with the type of the modeling material 201.

In the present embodiment, the modeling material 201 is not specifically charged in an active manner. However, the modeling material 201 may be triboelectrically charged in an active manner by mixing the modeling material 201 with another powder material and stirring the mixture, or by causing the modeling material 201 to pass through a nip between rotating members, as in the case of a toner for electrophotography. Accordingly, the external force F caused by the electrostatic force can be appropriately applied to the modeling material 201.

<Conditions for Generating External Force F>

Next, more detailed conditions for generating the external force F will be described.

It is assumed that a modeling material 201a takes time t (s) to land on the surface of the object 200 after flying, and a modeling material 201b takes time t+Δt (s) to land on the surface of the object 200 after flying. When the moving velocity of the carrier 111 is assumed to be $V_1$ (m/s), a variation in the landing positions of the modeling material 201a and the modeling material 201b can be expressed by the following formula (1).

$$V_1(t+\Delta t) - V_1(t) = V_1 \cdot \Delta t \quad (1)$$

When a voltage E (V) is assumed to be applied to the slit portion 155a having a width w (m), an electric field is represented by E/w (N/C). Further, when the amount of electric charge per unit mass of the modeling material 201 is assumed to be Q (C/kg), the acceleration applied to the modeling material 201 is represented by E·Q/w (m/s²).

Accordingly, the correction amount of the variation in the landing positions of the modeling material 201a and the modeling material 201b can be expressed by the following formula (2).

$$E \cdot Q \cdot (t+\Delta t)^2/(2 \cdot w) - E \cdot Q \cdot t^2/(2 \cdot w) = E \cdot Q \cdot t \cdot \Delta t/w \quad (2)$$

A voltage for correcting the variation in the landing positions is represented by V·Δt=E·Q·t·Δt/w, that is E=$V_1$·w/(Q·t).

The following are examples of estimated values for generating the external force according to the present embodiment.

Modeling material 201: PA 12
Amount of electric charge Q: 0.3 (mC/kg)
Moving velocity $V_1$: 0.1 (m/s)
Width w: 0.0015 (m)
Time t: 0.02 (s)
Voltage E: 26 (V)

There may be cases where an error occurs in the above-described estimated values due to an electric field that is not uniformly formed in the horizontal direction, a variation in air resistance due to the difference in particle sizes of modeling materials, an effect caused by the rotation of a modeling material, or the like. Therefore, it is preferable to adjust the conditions for generating the external force in a range of approximately ±50% of the estimated values.

<Effects of Three-Dimensional Modeling Apparatus 100>

As described above, in the present embodiment, when the modeling material 201 carried by the carrier 111 is caused to fly to the surface of the object 200, the external force F generated by an electric field is applied to the modeling material 201. The external force F acts in the direction opposite to the moving direction of the carrier 111. Further, the electric field is created by applying a voltage to the fixing member 155.

By applying the external force F to the flown modeling material 201, the modeling material 201 is moved in the direction opposite to the moving direction of the carrier 111. Accordingly, variations in the landing position of the modeling material 201 on the surface of the object 200 can be reduced. Further, as the flying time of the modeling material 201 increases, the amount of movement of the modeling material 201 by the external force F increases. Further, as the flying time of the modeling material 201 decreases, the amount of movement of the modeling material 201 by the external force F decreases. As a result, variations in the landing position of the modeling material 201 can be reduced.

As described above, variations in the landing position of the modeling material 201 on the surface of the object 200 caused by inertia and variations in flying time can be reduced, thereby improving fabrication quality.

Further, in the present embodiment, the fixing member 155 functioning to support the carrier 111 is used to apply a voltage to the carrier 111, thereby applying the external force F to the flown modeling material 201. That is, the carrier 111 can also function to apply the external force F. Thus, the external force F can be applied to the flown modeling material 201 without any additional configuration for applying the external force F.

Second Embodiment

Next, a three-dimensional modeling apparatus 100a according to a second embodiment will be described. FIG. 5 is a diagram illustrating an example configuration of an electrically conductive member 160 of the three-dimensional modeling apparatus 100a. In FIG. 5, an arrow 30 indicates the moving direction of the carrier 111, and an arrow 32 indicates the scanning direction of the pulsed laser light 115a.

As illustrated in FIG. 5, the electrically conductive member 160 includes a wire 160a and a wire 160b, and is disposed in a space between the carrier 111 and the object 200. The wire 160a and the wire 160b, constituting the electrically conductive member 160, are spaced apart from each other in a direction along the moving direction of the carrier 111, such that the pulsed laser light 115a passes between the wire 160a and the wire 160b.

Each of the wires 160a and 160b is an elongated member that is made of highly electrically conductive metal such as nickel, and the long side of each of the wires 160a and 160b is in the scanning direction of the pulsed laser light 115a.

Further, the wire 160a disposed on the upstream side in the moving direction of the carrier 111 is electrically connected to a grounded portion 161, and the wire 160b disposed on the downstream side is connected to a power supply 162. The power supply 162 applies a voltage to the wire 160a, thereby creating an electric field in the space between the wire 160a and the wire 160b. Accordingly, an electrostatic force generated by the electric field can be applied to the flown modeling material 201 as the external force F.

When the modeling material 201 carried by the carrier 111 is irradiated with the pulsed laser light 115a and flies to the surface of the object 200, the flown modeling material 201 is moved by the external force F in the direction opposite to the moving direction of the carrier 111. Accordingly, variations in the landing position of the modeling material 201 on the surface of the object 200 can be reduced.

An electric field can be directly controlled by the electrically conductive member 160 including the wires 160a and 160b without the fixing member 155. Therefore, variations in the landing position of the modeling material 201 can be more preferably reduced. A method for setting the voltage applied to the electrically conductive member 160 and the arrangement of the wires 160a and 160b are similar to those described in the first embodiment, and a duplicate description thereof will be omitted.

Third Embodiment

Next, a three-dimensional modeling apparatus 100b according to a third embodiment will be described. In the present embodiment, an external force is applied to a flown modeling material by supplying air to the flown modeling material. In this manner, variations in the landing position of the modeling material on the surface of the object can be reduced.

Figure 6:
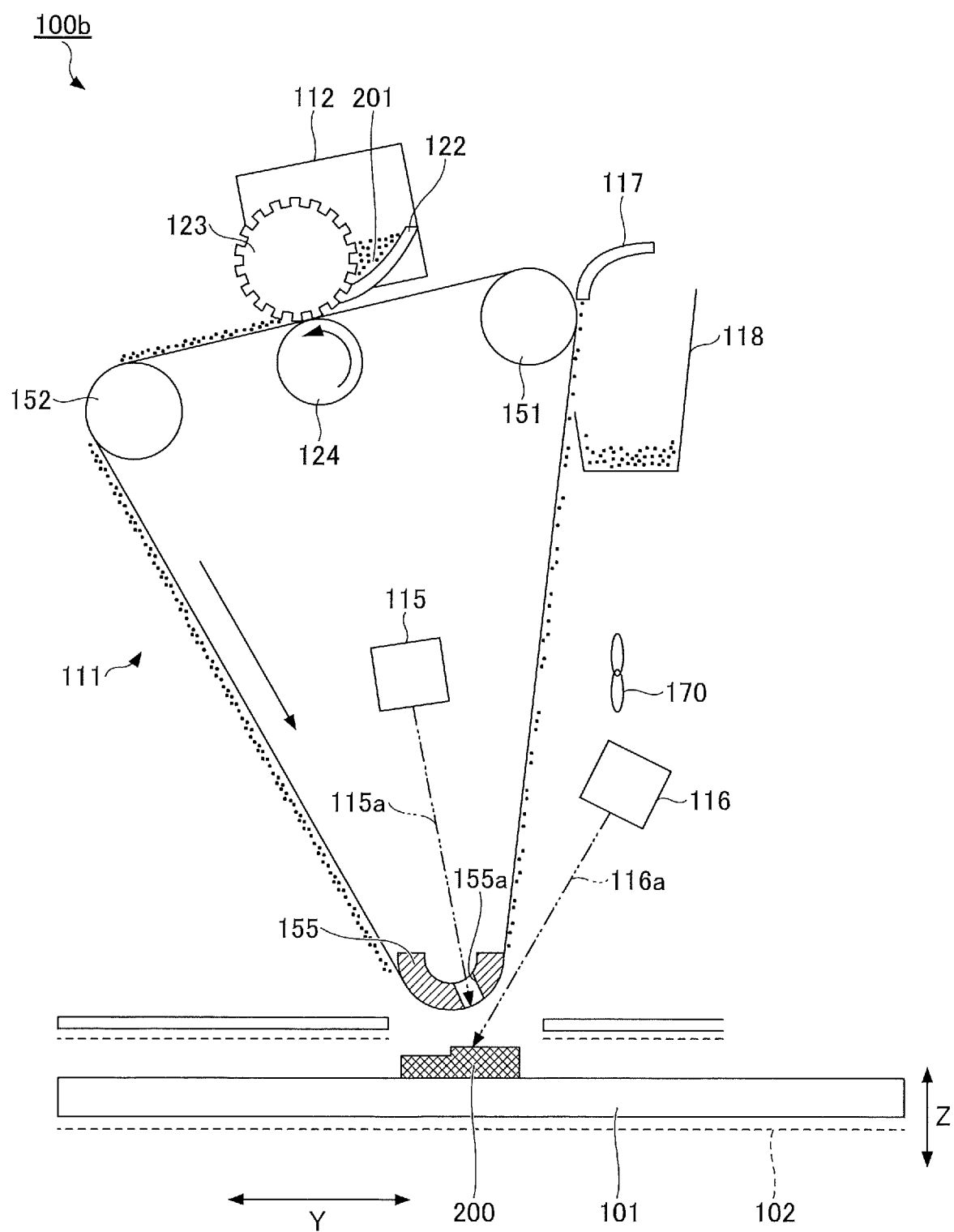
FIG. 6 is a diagram illustrating an example configuration of a three-dimensional modeling apparatus according to a third embodiment.

FIG. 6 is a diagram illustrating an example configuration of the three-dimensional modeling apparatus 100b. As illustrated in FIG. 6, the three-dimensional modeling apparatus 100b includes a fan 170 that is an example of an air blower.

The fan 170 is configured to be operated when the modeling material 201 is caused to fly, and to blow air to the flown modeling material 201 in the direction opposite to the moving direction of the carrier 111. In this manner, the external force F is applied to the modeling material 201 by the power of the airflow. Accordingly, variations of the landing position of the modeling material 201 on the surface of the object can be reduced.

The speed of airflow from the fan 170 is preferably the same as or is in a range of ±50% of the moving velocity of the carrier 111 such that variations in the flying direction of the modeling material 201 can be eliminated. In the present embodiment, the speed of airflow is set to 0.1 (m/s) that is the same as the moving velocity of the carrier 111.

When the external force F is applied by the electrostatic force generated by an electric field, there may be cases where the operation of the three-dimensional modeling apparatus may be affected by an electric discharge. However, in the present embodiment, because the external force F is caused by the power of the airflow, the three-dimensional modeling apparatus can fabricate a three-dimensional object without being affected by an electric discharge.

However, there may be cases where natural convection may affect the operation of the three-dimensional modeling apparatus. Therefore, it is preferable to take into account the state of airflow. In addition, in order to stabilize airflow, it is preferable to constantly generate ionic wind by a capacitor instead of the fan.

Fourth Embodiment

Next, a three-dimensional modeling apparatus 100c according to a fourth embodiment will be described. In the present embodiment, an electrostatic force is used to apply an external force to a modeling material that has flown. Accordingly, variations in the landing position of the modeling material on the surface of the object can be reduced. Further, the three-dimensional modeling apparatus 100c includes a supply device configured to stably supply the modeling material to a carrier. The supply device includes a conveyance carrier configured to carry and convey the modeling material stored in a material container, and a regulator configured to regulate the layer thickness of the modeling material carried by the conveyance carrier.

Figure 7:
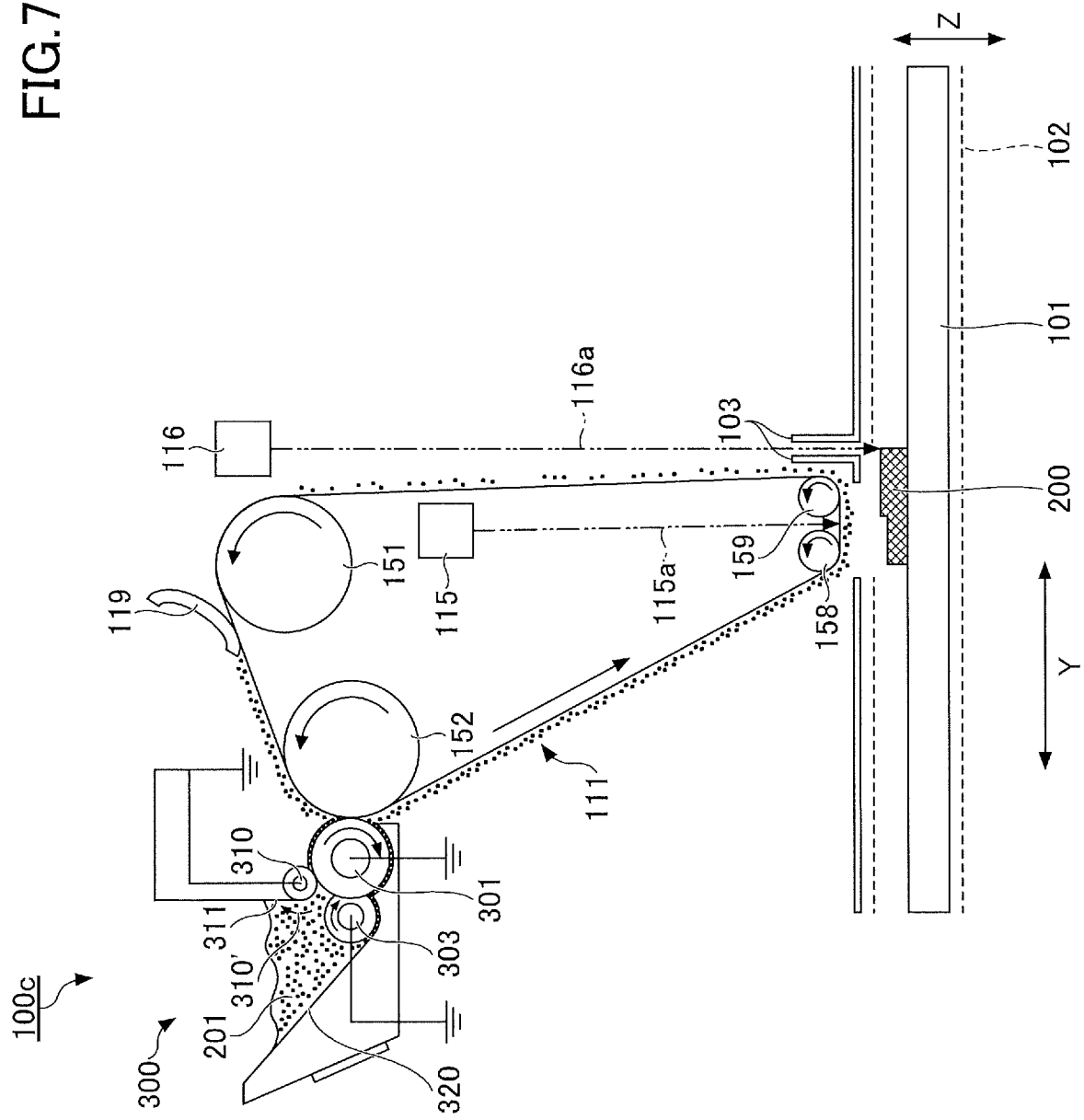
FIG. 7 is a diagram illustrating an example configuration of a three-dimensional modeling apparatus according to a fourth embodiment.

FIG. 7 is a diagram illustrating an example configuration of the three-dimensional modeling apparatus 100c. As illustrated in FIG. 7, the three-dimensional modeling apparatus 100c includes small-diameter rollers 158 and 159, a slit 103, and a supply device 300.

The small-diameter rollers 158 and 159 are support members that support the carrier 111 by contacting the inner side of the carrier 111. The carrier 111 is stretched over the small-diameter rollers 158 and 159, and the small-diameter rollers 158 and 159 are driven to rotate in accordance with the circulation movement of the carrier 111.

Instead of the fixing member 155 (see FIG. 1) according to the first embodiment, the small-diameter rollers 158 and 159 functioning as the support members that support the carrier 111 are provided. Accordingly, the carrier 111 can be circularly moved at high speed, and also an effect of preventing static electricity can be obtained.

Further, the small-diameter roller 158 is electrically connected to the grounded portion 156 (see FIG. 4), and the small-diameter roller 159 is connected to the power supply 157 (see FIG. 4). When the pulsed laser light 115a is emitted from the flying laser 115 to the carrier 111, the three-dimensional modeling apparatus 100c causes the power supply 157 to apply a voltage so as to create an electric field between the small-diameter roller 158 and the small-diameter roller 159.

Typically, the modeling material 201 carries minute electric charges during the conveyance of the modeling material 201. Therefore, an electrostatic force acting in a direction opposite to the moving direction of the carrier 111 can be applied to the modeling material 201. This electrostatic force causes the flown modeling material 201 to be moved in the direction opposite to the moving direction of the carrier 111, thereby reducing a landing position variation as indicated by d in FIG. 3C.

The slit 103 is a member having an opening through which the laser light 116a emitted from the melting laser 116 passes. In the three-dimensional modeling apparatus 100c, the object 200 is irradiated with the laser light 116a that has passed through the slit 103.

By causing the melting laser 116 to pass through the slit 103, the object 200 can be vertically irradiated with the laser light 116a while the heat dissipation of the object 200 is reduced. Further, it is preferable to provide an infrared camera having an optical system coaxial with the optical axis of the melting laser 116. With the above-described infrared camera, the melting state and the temperature of the object 200 being irradiated with the laser light 116a can be observed, and the fabrication can be controlled based on the observed conditions of the object 200.

The supply device 300 includes a modeling material container 320, a carrying roller 301, a supplying roller 303, a doctor roller 310, and a scraper 311. The supply device 300 is configured to supply the modeling material 201 to the carrier 111.

The modeling material container 320 is a container that stores the modeling material 201. The carrying roller 301 is an example of a conveyance carrier configured to carry, on the surface thereof, and convey the modeling material 201 stored in the modeling material container 320.

The supplying roller 303 is rotatably provided in the modeling material container 320, and is configured to rotate to supply the modeling material 201 to the carrying roller 301. The doctor roller 310 is rotatably provided such that the surface of the doctor roller 310 is in proximity to the surface of the carrying roller 301. The doctor roller 310 is configured to regulate the thickness of the modeling material 201, carried on the surface of the carrying roller 301, while rotating. The doctor roller 310 is an example of a regulator.

The scraper 311 is configured to clean the doctor roller 310 by scraping off the modeling material 201 remaining on the surface of the doctor roller 310 while contacting the surface of the doctor roller 310.

In the three-dimensional modeling apparatus 100c, the supply device 300 is disposed on the upstream side in the rotational direction of the carrying roller 301. The supplying roller 303 supplies the modeling material 201 to the carrying roller 301, and the doctor roller 310 regulates the thickness of the modeling material 201 on the surface of the carrying roller 301. In this manner, the supply device 300 can continuously and stably form a thin layer of the modeling material 201 on the surface of the carrying roller 301.

The carrying roller 301 contacts the carrier 111 and transfers the thin layer of the modeling material 201 onto the surface of the carrier 111, thereby forming the thin layer of the modeling material 201 on the surface of the carrier 111.

The thin layer of the modeling material 201 can firmly adhere to the surface of the carrier 111 when V111<V301 is satisfied, where V111 denotes the conveying speed of the carrier 111 and V301 denotes the peripheral speed of the carrying roller 301.

Further, the configuration and the arrangement of the supply device 300 can be changed in accordance with the type of the modeling material 201 stored and held in the modeling material container 320. For example, the material or the outer diameter of each of the carrying roller 301 and the supplying roller 303, the shape of the doctor roller 310, or the contact pressure or the contact position of the doctor roller 310 with respect to the carrying roller 301 can be changed. The supply device 300 can preliminarily store the above-described information in an information storage unit such as an IC chip, and the supply device 300 can acquire and change the information by referring to the information storage unit as necessary.

Further, it is preferable to dispose a leveling blade on the upstream side of the supply device 300. The leveling blade can make the modeling material 201 uniform in a pre-step before the modeling material 201 is supplied and make the amount of the modeling material 201 uniform after the modeling material 201 passes through the supply device 300.

Further, although the embodiments of the present invention have been described in detail above, the present invention is not limited to the particulars of the above-described embodiments, and variations and modifications may be made to the above-described embodiments without departing from the scope of the present invention.

Further, a three-dimensional modeling method according to an embodiment of the present invention is also provided. For example, the three-dimensional modeling method includes carrying a modeling material by a carrier, causing the modeling material carried by the carrier to fly to a surface of an object, and applying a predetermined external force to the flown modeling material. Accordingly, an effect similar to that of the three-dimensional modeling apparatus can be obtained by the three-dimensional modeling method.

According to at least one embodiment, fabrication quality can be improved.

What is claimed is:

1. A three-dimensional modeling apparatus comprising:
a carrier belt configured to carry a modeling material, the carrier belt being a continuous belt;
a first laser configured to emit laser light that causes the modeling material carried on the carrier belt to fly to a surface of an object; and
a carrier support including
an outer peripheral surface that the contacts the carrier belt, and
a slit portion configured to permit the passage of the laser light emitted by the laser through the carrier support to cause the modeling material carried on the carrier belt to fly to the surface of the object, wherein
the carrier support is composed of an electrically conductive material, and
the carrier support is configured to apply a predetermined external force to the modeling material as the modeling material is flying, wherein the predetermined external force is caused by an electrostatic force.

2. The three-dimensional modeling apparatus according to claim 1, wherein the carrier support applies the predetermined external force in a direction opposite to a direction in which the carrier belt moves.

3. The three-dimensional modeling apparatus according to claim 1, wherein the predetermined external force applied by the carrier support is a voltage that is applied to the carrier belt.

4. The three-dimensional modeling apparatus according to claim 1, further comprising:
an electrically conductive member disposed between the carrier belt and the object, wherein
the carrier support applies the predetermined external force to the modeling material by applying a voltage to the electrically conductive member.

5. The three-dimensional modeling apparatus according to claim 1, further comprising:
a fan configured generate airflow that is applied to the modeling material as the modeling material is flying.

6. The three-dimensional modeling apparatus according to claim 1, further comprising a supply device configured to supply the modeling material to the carrier belt,
wherein the supply device includes
a material container configured to store the modeling material,
a conveyance carrier configured to carry and convey the modeling material stored in the material container, and
a regulator configured to regulate a layer thickness of the modeling material carried by the conveyance carrier.

7. The three-dimensional modeling apparatus according to claim 1, wherein the first laser is a pulsed laser that applies radiation pressure to the modeling material to cause the modeling material to fly.

8. The three-dimensional modeling apparatus according to claim 1, wherein
the first laser is disposed on an inner side of the carrier belt, and
an inner peripheral surface of the carrier support faces toward the first laser.

9. The three-dimensional modeling apparatus according to claim 1, further comprising:
a second laser configured to emit laser light that melts the surface of the object towards which the modeling material is caused to fly, the second laser being disposed on an outer side of the carrier belt.

10. The three-dimensional modeling apparatus according to claim 1, wherein a landing position of a portion of the modeling material, which is ejected off the carrier belt by the first laser, is altered in response to the predetermined external force.

11. The three-dimensional modeling apparatus according to claim 9, wherein
the second laser is a continuous-wave laser.

* * * * *